United States Patent [19]

Fischbeck

[11] 4,291,103

[45] Sep. 22, 1981

[54] ASSEMBLY OF THIN-WALLED PLATES

[75] Inventor: Karl-Heinz Fischbeck, Wilhelmshaven, Fed. Rep. of Germany

[73] Assignee: Olympia Werke AG, Wilhelmshaven, Fed. Rep. of Germany

[21] Appl. No.: 45,734

[22] Filed: Jun. 5, 1979

[30] Foreign Application Priority Data

Jun. 5, 1978 [DE] Fed. Rep. of Germany ....... 2824539

[51] Int. Cl.³ .......................... B32B 3/24; B32B 7/08; B21D 28/26

[52] U.S. Cl. .................................... 428/589; 428/594; 428/596; 428/597

[58] Field of Search ............... 428/596, 597, 589, 590, 428/594

[56] References Cited

U.S. PATENT DOCUMENTS

| | | | |
|---|---|---|---|
| 2,482,990 | 9/1949 | Olson | 428/596 X |
| 2,530,371 | 11/1950 | Benson | 428/594 X |
| 2,547,941 | 4/1951 | Heftler | 428/594 X |
| 2,878,552 | 3/1959 | Wirt | 428/594 |
| 2,944,329 | 7/1960 | MacKay | 428/596 X |
| 3,366,356 | 1/1968 | Fisher | 248/56 |
| 3,869,778 | 3/1975 | Yancey | 428/596 X |
| 3,946,398 | 3/1976 | Kyser et al. | 310/332 X |

FOREIGN PATENT DOCUMENTS

| | | | |
|---|---|---|---|
| 203603 | 10/1956 | Australia | 428/596 |

*Primary Examiner*—Richard D. Lovering
*Attorney, Agent, or Firm*—Spencer & Kaye

[57] ABSTRACT

A thin-walled plate provided with at least one reamed hole for mounting the plate on a centering element which extends through the hole, the largest dimension of the reamed hole in one direction being smaller than the smallest dimension of the centering element in the same direction, and with at least two elongate perforations located adjacent, and at opposite sides of, the hole and spaced from the edge of the hole to define plate portions in the form of bars between the perforations and the hole, the bars being displaceable into the region of the perforations upon insertion of the centering element into the hole.

10 Claims, 6 Drawing Figures

FIG.5
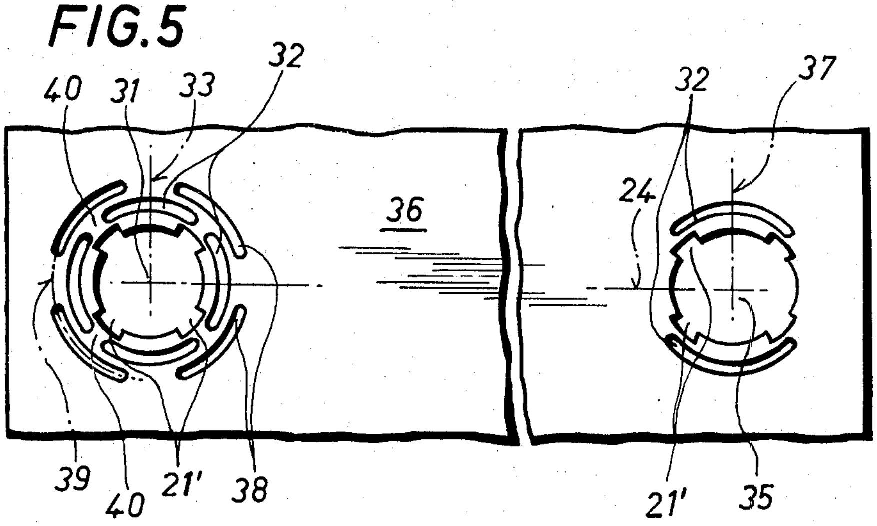
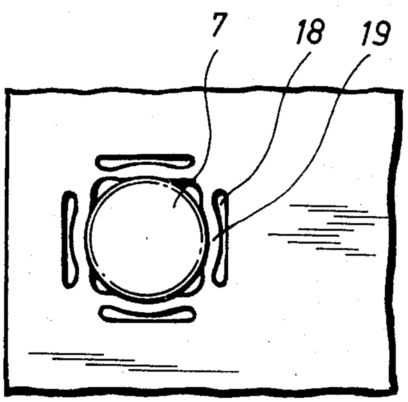
FIG.6

ASSEMBLY OF THIN-WALLED PLATES

BACKGROUND OF THE INVENTION

The present invention relates to thin-walled plates provided with reamed holes via which such plates can be threaded onto centering means, particularly for forming packets of such plates into an ink printing head in sandwich structure, for which purpose the plates are provided with recesses in the form of perforations or semiperforations.

These plates are made of thin-walled sheet metal, metal foil or foils of a ferrous or nonferrous material, and particularly are plates into which structures, cavities, channels or other shapes have been etched. The plates, when assembled in a packet, are bonded together, for example by a diffusion welding process, and then form fluidic elements used, for example, in the control and regulating art to conduct and deflect flowing media.

Such arrangements are also utilized in ink printers where they constitute ink printing heads having a sandwich structure. The latter present chambers and channels which have been combined into pressure systems as well as inlet and outlet channels for the printing fluid to be applied to a print carrier. For structural design reasons, the energy flow channels of the pressure systems, the ink inlets and outlets for the nozzles change their position and direction within the plates. Often the nozzles are shaped by means of semi-etching into oppositely disposed plates. The slightest inaccuracies and tolerances during manufacture, assembly and during the subsequent heat treatment process lead to offset junctions, overlaps in the channel and nozzle paths etc., which interfere with the passage of the fluid and counteract the controlling effect and the discharge of the fluid.

An ink printing head of this type is disclosed, for example, in German Offenlegungsschrift [Laid-open Application] No. 2,649,970. The cavities and channels passing through the individual plates at different levels exhibit, for example, smaller cross sections in the regions of higher flow speeds, in order to produce such higher flow speeds, so that an inaccuracy in the transition of one channel from plate to plate would have the effect of an even greater interference in the flow behavior and a reduction in the actual discharge speed from the nozzle. Since the plates of such an ink printing head are constituted by foils of a few hundredths of a millimeter in thickness, reamed holes can not be worked and fitted to have a normal press fit on the centering means if extensive deformation of the plate is to be avoided when it is placed onto the centering means.

Although German Auslegeschrift [Published patent Application] No. 2,359,110 discloses a displaceable bar which can be elastically deformed in a radially outward direction for the purpose of clamping a shaft in a bore, extreme accuracy is not a requirement in seating such a shaft and deflection in all directions as a result of pressing the shaft into the bore does not take place so that this arrangement does not serve to maintain centering distances.

SUMMARY OF THE INVENTION

It is an object of the present invention to provide such a plate with a reamed hole which is capable of assuming the actual dimensions of associated centering means independently of dimensional variations within design tolerances during manufacture, without the center distances of the reamed holes of adjacent plates being changed with respect to their position or dimensions.

This and other objects are achieved according to the invention, by providing a thin-walled plate which has at least one reamed hole for mounting the plate on a centering element which extends through the hole, with the largest dimension of the reamed hole in one direction being smaller than the smallest dimension of the centering element in that direction, and at least two elongate perforations located adjacent, and at opposite sides of, the hole, the perforations being spaced from the edge of the hole to define plate portions in the form of bars between the perforations and the hole, and the bars being displaceable into the region of the perforations upon insertion of the centering element into the hole.

BRIEF DESCRIPTION OF THE DRAWINGS

FIGS. 3–5 are plan views of preferred embodiments of the invention.

FIG. 6 is a plan view showing a plate with a reamed hole having a form shown in FIG. 3 with inserted fitting pin.

DESCRIPTION OF THE PREFERRED EMBODIMENTS

Figure 1:
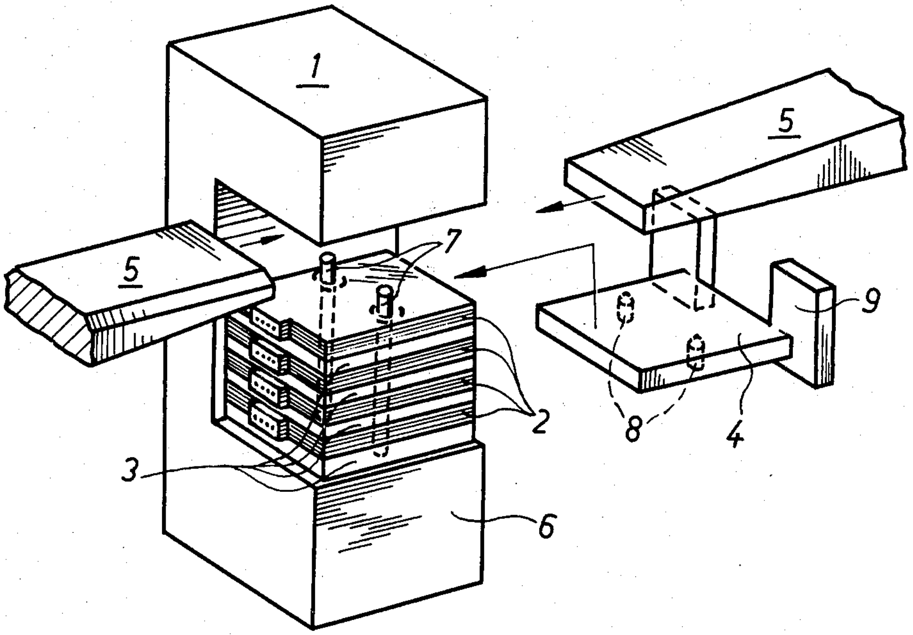
FIG. 1 is a perspective view illustrating a packet of plates inserted in a known manner into a welding accessory device, or jig.
Figure 2:
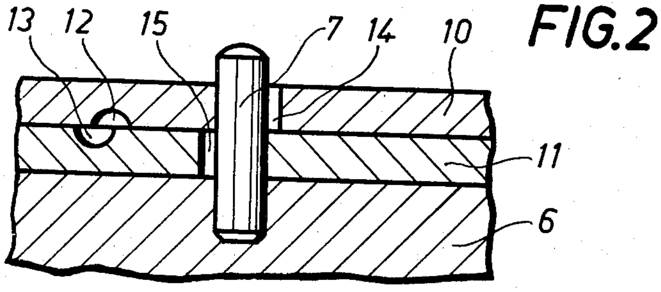
FIG. 2 is a cross-sectional, detail view illustrating two assembled plates not employing the invention.

FIGS. 1 and 2 essentially serve to illustrate the problems obviated by the present invention. FIG. 1 shows a welding block 1 of high strength steel having a U-shaped cavity to accommodate sheet metal packets 2, intermediate layers 3, a printing plate 4 and two wedges 5 to produce a preliminary print. The preliminary print causes in this push-out collet a compression of the sheet metal packets 2 and a planar contact between the thin walled plates. A cover-like portion for closing the open side is not shown.

Bores for receiving two centering means, here constituted by fitting pins 7, are provided in the base portion 6 and the intermediate layers 3 are fitted onto these pins in alternation with the sheet metal packets 2. The printing plate 4 is provided with two downwardly open blind bores 8 for accommodating the protruding ends of the fitting pins.

After the packets 2 have been placed onto the fitting pins in alternation with the intermediate layers 3, the printing plate 4 has been placed thereover and the open side of the welding block has been closed, wedges 5 are pushed in in such a way that the upper wedge is first inserted from the left to the right and then the lower wedge is inserted in the opposite direction so that the printing plate is held in the welding block. The positioning of plate 4 is aided by the collars 9 formed thereon. Thus displacement forces which might act on the stacked sheet metal packets and the intermediate layers can be avoided. The welding block completed in this manner is subjected to the influence of heat in a furnace so as to produce the required pressure during the welding and to accelerate the welding process.

As already mentioned in detail, the use of press fits between the fitting pins and conventional reamed holes in the plates to be packeted is impossible since this would lead to deformations in the edge regions of the reamed holes. In contradistinction thereto, FIG. 2 shows an example for a case where the fit has play. For example, a short fitting pin 7 with two plates 10 and 11 thereon has been inserted onto the base portion 6 of block 1. Two half-channels 12 and 13 have been formed in these plates, for example by etching. The diameter of these channels is generally a few one hundredths of a millimeter and their offset positions with respect to one another demonstrate that the play 14 and 15 present between plates 10 and 11 and the fitting pin 7 is too large. Moreover, this play 14 and 15 has been shown not to scale and has been exaggerated to facilitate comprehension. The above explanations demonstrate that neither a fit with play nor a press fit of the conventional type can be used for placing the plates 10, 11 and further plates onto the fitting pin(s) 7, since dimensions and distances from the center become inaccurate and, in the case of a press fit, deformations of the plates 10, 11 as well as the other plates cannot be avoided. These drawbacks are overcome by the present invention.

Figure 3:
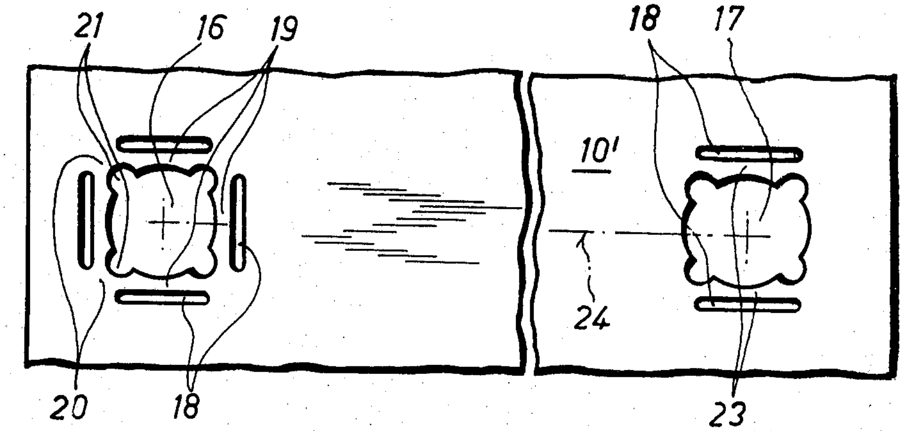

FIG. 3 shows a plate 10′ with reamed holes 16 and 17 formed according to two embodiments of the invention. Each hole is basically a cylindrical hole having a diameter which produces a press fit with an associated fitting pin. The associated fitting pin might typically have a diameter of 2 mm, and the fitting pin could be given any other diameter if the reamed hole were appropriately dimensioned.

The reamed hole 16 is associated with four elongate perforations, or cutouts, 18 which are formed in plate 10′ in a square pattern in the edge region of the reamed hole. These perforations are shaped in the same manufacturing process as the reamed holes 16 and 17. Narrow bars 19 remain on all sides between the reamed hole 16 and the perforations 18. When the fitting pin is inserted or when the plates are placed onto the fitting pin, respectively, these bars 19 are forced outwardly into the perforation region of the perforations 18, as shown in FIG. 6, so that the reamed hole 16, and the same applies with corresponding use also for reamed hole 17, takes on the precise diameter of the fitting pin.

In order to reduce the cross section of the material in the regions 20 of the bars remaining between the perforations 18, the reamed hole is provided with bays 21 at spacings of 90° around the hole axis to slightly reduce the deformation resistance of the bars and to compensate for the absence of perforations in those regions.

In contrast to the reamed hole 16, the reamed hole 17 is provided with, for example, only two diametrically opposed perforations 18 so as to accommodate the bars 23 upon outward displacement thereof. The reamed hole 17 is not circular, but rather has two different diameters, the smaller of which extends between perforations 18 and has a value which causes bars 23 to bear firmly against an inserted fitting pin. The larger diameter of reamed hole 17 extends in the direction of the line 24 which connects the centers of both reamed holes 16 and 17 and is greater than the diameter of the fitting pin to be inserted, in order to permit, for example, changes in length in the assembled pieces during heating in the welding block.

Figure 4:
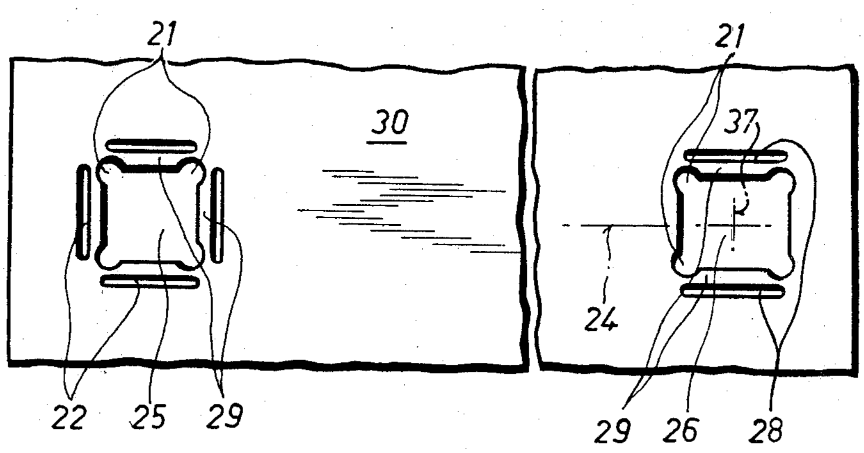

FIG. 4 illustrates an embodiment in which a plate 30 is provided with reamed holes 25 and 26 which have a square and rectangular cross section, respectively. Any other cross-sectional shape is also conceivable for reamed holes 25, 26. These holes are also provided to receive cylindrical fitting pins of circular cross section.

Hole 25 has a square configuration and is surrounded on all four sides by a square array of elongated perforations 22 separated from the sides of the hole by bars 29. Each side of hole 25 is dimensioned to achieve a secure fit with the associated fitting pin.

Hole 26 is of rectangular configuration, having long sides which extend parallel to a line 24 passing between the centers of holes 25 and 26 and short sides parallel to line 37 which is perpendicular to line 24. Plate 30 is provided with two perforations 28 which extend parallel to the long sides of hole 26 and are spaced from those bars by expansion 29.

Each hole 25 and 26 is provided at its corners with bays, or recesses, 21 to enlarge the hole in the regions between perforations 22 or at the ends of perforations 28.

The distance between opposed sides of hole 25, or between the long sides of hole 26, is made slightly smaller than the diameter of the fitting pin. The distance between the sides of hole 26 which are perpendicular to line 24 is made larger than the fitting pin diameter to allow for changes in length occurring, for example, during heat treatment in the welding block and in the sheet metal packets.

It is understood that the elongate perforations associated with the reamed holes 16 and 17 of FIG. 3 can be adapted to the basic shape of the reamed hole, as is the case in FIG. 4. Thus, FIG. 5 shows an embodiment provided with a circular reamed hole 31 having bays 21′ formed with a generally rectangular configuration. Surrounding hole 31 are elongate perforations 32 which are designed to correspond to the cylindrical shape of the reamed hole 31. The perforations 32 which face one another in the edge regions of the cylindrical bore are again arranged on a common circle whose diameter is slightly larger than the diameter of the reamed hole. Each perforation extends generally between two successive bays. A second group of perforations 38 is disposed around perforations 32, centered on a circle 39 having a diameter larger than that of the circle on which perforations 32 are arranged. Each perforation 38 is associated with a bar 40 between two perforations 32 to help reduce the deformation resistance of the plate in the regions of bars 40. Perforations 38 are offset angularly from perforations 32, such that two perforations 38 are disposed to each side of a line 33 which extends at a right angle to the center line 24 connecting the reamed holes, and two perforations 38 are on each side of line 24.

The plate 36 is also provided with a reamed hole 35 which is noncircular and which has regions with two different diameters, the smaller diameter of hole 35 extending in the direction of line 37 perpendicular to line 24 and being smaller than the smallest possible dimension of the centering means or of the fitting pin to be inserted, respectively. The other inner diameter, in the direction of the line 24, is larger than the largest possible dimension of the centering means. Hole 35 is also provided with bays 21′ of the type described above.

In addition, two relatively long, arcuate perforations 32 are provided around hole 35, each perforation being disposed at a respectively opposite side of line 24 and being centered on line 37.

FIG. 6 shows a fitting pin 7 which has been inserted into a reamed hole of the type shown in FIG. 3, so that bars 19 have been deflected into the spaces provided by perforations 18. In any embodiment of the invention, the width of the bars must be small enough that deflection into the perforations occurs and, on the other hand, large enough to give the bars a resistance to deformation sufficient to keep the plate in the arrested position. The widths of the perforations must be selected under the same considerations so that the bars can be fully deflected thereinto.

It will be understood that the above description of the present invention is susceptible to various modifications, changes and adaptations, and the same are intended to be comprehended within the meaning and range of equivalents of the appended claims.

What is claimed is:

1. An assembly comprising:

a stack of thin-walled plates each provided with at least one reamed hole for mounting the plate on a centering element which extends through the hole, wherein the largest dimension of the reamed hole in one direction, when no centering element is present, is smaller than the smallest dimension of the centering element in the same direction, each said plate being further provided with two elongate perforations located adjacent, and at opposite sides of, said hole, said perforations being spaced from the edge of said hole to define plate portions in the form of bars between said perforations and said hole, and said bars being displaceable into the region of said perforations upon insertion of a centering element into said hole; and a centering element passing through said hole in each said plate to displace said bars into the regions of their associated perforations and align said plates with one another.

2. Assembly as defined in claim 1 wherein said plates are provided with recesses.

3. Assembly as defined in claim 1 wherein each said plate is provided with two of said reamed holes each having at least two associated perforations and one said hole has its two perforations arranged on a circle having a diameter slightly larger than the diameter of said one hole, with each said perforation being centered on a line passing through the center of said one hole and extending at right angles to a line connecting the centers of said two reamed holes.

4. Assembly as defined in claim 3 wherein each said perforation associated with said one hole of each said plate is disposed such that its length is tangent to said circle on which said perforations are arranged in the region of said line at right angles to the line connecting the centers of said two holes.

5. Assembly as defined in claim 3 wherein, in each said plate, the dimension of each said reamed hole perpendicular to the line connecting their centers is smaller than the dimension in the same direction of the centering element associated therewith and the dimension of one said reamed hole along such line is greater by a finite amount than the dimension in the same direction of the centering element associated therewith.

6. Assembly as defined in claim 1 wherein, in each said plate, said reamed hole has a circular shape and said perforations are disposed coaxially about said hole.

7. Assembly as defined in claim 1 wherein, in each said plate, said reamed hole has the shape of a regular polygon and said elongate perforations extend parallel to respective sides of the polygon.

8. Assembly as defined in claim 1 wherein, in each said plate, said reamed hole is provided with recesses forming bays in the region of the ends of said perforations.

9. Assembly as defined in claim 8 wherein, in each said plate, each said bay is located in a region between the ends of two adjacent perforations and said plate presents, adjacent each said bay, a portion in the form of an additional bar between said perforation ends located in the region of said bay.

10. Assembly as defined in claim 9 wherein each said plate is additionally provided with further elongate perforations located outside of the region enclosed by said first-recited perforations and each extending past a respective additional bar.

* * * * *